United States Patent [19]

Porta

[11] Patent Number: 5,259,903
[45] Date of Patent: Nov. 9, 1993

[54] METHOD FOR MANUFACTURING BUNDLES OF SEMIPERMEABLE HOLLOW FIBERS FOR A MEMBRANE DEVICE

[75] Inventor: Julien Porta, Chavanoz, France

[73] Assignee: Hospal Industrie, France

[21] Appl. No.: 804,432

[22] Filed: Dec. 10, 1991

[30] Foreign Application Priority Data

Dec. 11, 1990 [FR] France ................... 90 15744

[51] Int. Cl.[5] .................... B65H 81/00; B01D 63/02; B01D 63/10
[52] U.S. Cl. ..................... 156/174; 156/169; 156/177; 156/250; 156/296; 210/321.8; 210/321.89; 210/500.23
[58] Field of Search ............... 156/174, 177, 173, 178, 156/296, 441, 436, 217, 250, 256; 210/321.8, 321.89, 500.23; 165/180, 158; 29/890.036, 890.038, 890.04

[56] References Cited

U.S. PATENT DOCUMENTS

| | | | |
|---|---|---|---|
| 3,277,959 | 10/1966 | Withers | 165/180 |
| 3,391,041 | 7/1968 | Moore | 156/174 |
| 3,690,465 | 9/1972 | McGinnis et al. | 210/321.89 X |
| 3,801,401 | 4/1974 | Cope et al. | 156/177 X |
| 4,172,794 | 10/1979 | Sigdell | 210/321.89 X |
| 4,211,597 | 7/1980 | Lipps et al. | 210/321.8 X |
| 4,226,378 | 10/1980 | Fitzgerald et al. | 210/321.89 X |
| 4,341,005 | 7/1982 | Oscarsson | 210/321.89 X |
| 4,689,255 | 8/1987 | Smoot et al. | 210/321.89 X |

FOREIGN PATENT DOCUMENTS

0093677A1 11/1983 European Pat. Off. .

Primary Examiner—Jeff H. Aftergut
Attorney, Agent, or Firm—Finnegan, Henderson, Farabow, Garrett & Dunner

[57] ABSTRACT

The method of manufacturing a plurality of bundles of semipermeable hollow fibers for a membrane device from a sheet of fibers (19) formed by winding a fiber or a stranded set of fibers (11) on a drum (1, 2) consists in:
cutting the sheet of fibers (19) on the drum (1, 2) along a line of cut that is substantially parallel to the axis of the drum (1, 2);
laying out the sheet of fibers (19) on a plane (14);
rolling up the sheet of fibers (19) in a direction perpendicular to the line of cut to form a single bundle of fibers (45); and
cutting up the single bundle of fibers (45) into a plurality of bundles for a membrane device.

12 Claims, 5 Drawing Sheets

METHOD FOR MANUFACTURING BUNDLES OF SEMIPERMEABLE HOLLOW FIBERS FOR A MEMBRANE DEVICE

BACKGROUND OF THE INVENTION

1. Field of the Invention

The present invention relates to a method and apparatus for manufacturing bundles of semipermeable hollow fibers for a membrane device.

More particularly, the invention relates to manufacturing bundles of hollow fibers for constituting the membrane of exchanger type devices in which the membrane delimits two compartments through which fluids of different kinds are caused to flow in order to cause transfers to take place from one fluid to the other by diffusion and/or by convection. By way of example, mention may be made of hemodialyzers which are used to purify the blood of patients suffering from kidney failure.

2. Description of the Related Art

For any given kind of membrane, the efficiency of an exchanger is related mainly to the way in which the bundle of fibers is structured, with efficiency being maximal when the fluid flowing over the outsides of the fibers is constrained to flow uniformly between the fibers and is prevented from clearing itself preferential paths through the bundle.

European patent No. 0 093 677 describes a method of manufacturing bundles of hollow fibers enabling bundles to be obtained of a structure which is optimal with respect to exchanges between fluids in the devices in which they are installed. This method consists in forming a sheet of fibers on a drum of polygonal section by winding a fiber on the drum while causing it to move back and forth regularly from one end of the drum to the other. The tubular sheet obtained in this way is thus constituted by a plurality of layers of turns, with the turns in any layer being at a substantially constant angle relative to the turns of the adjacent layers. Once it has been made up, the sheet is secured to the drum along each of the edges of the drum and is then cut up along said edges into as many sheet portions as the polygonal section of the drum has sides. The sheet portions are then removed from the drum and are rolled up individually about an axis perpendicular to the lines of cut to form bundles of hollow fibers ready for installing in the housings of membrane devices.

Manufacturing bundles of hollow fibers from the sheet formed on the drum in accordance with that method requires quite a large number of manipulations and this is detrimental to industrial throughput and to uniformity of the manufactured bundles. In addition, that method requires as many different drums to be available as there are different lengths of bundle to be manufactured, or else it requires large quantities of fiber to be discarded when manufacturing smaller sized bundles.

SUMMARY OF THE INVENTION

The object of the present invention is to improve that method.

To achieve this object, the present invention provides a method of manufacturing a plurality of bundles of semipermeable hollow fibers for membrane devices from a sheet of fibers formed by winding a fiber or a stranded set of fibers on a drum, the method being characterized in that it comprises the steps of:

cutting the sheet of fibers on the drum along a line of cut that is substantially parallel to the axis of the drum;

laying out the sheet of fibers on a plane;

rolling up the sheet of fibers in a direction perpendicular to the line of cut to form a single bundle of fibers; and cutting up the single bundle of fibers into a plurality of bundles for a membrane device.

According to a feature of the method of the invention, the bundle of fibers is placed in a sheath prior to being cut up into a plurality of bundles of fibers. Advantageously, a flexible film for forming the sheath that is to contain the bundle of fibers is laid on the plane prior to the step of laying the sheet of fibers on the plane so that at the end of the step of rolling up the sheet of fibers the film envelops the bundle of fibers, the film then being closed onto itself by fixing together its longitudinal edges.

According to another feature of the method of the invention, the step of rolling up the sheet of fibers consists in:

laying the sheet of fibers on a piece of flexible sheet material having a fixed edge held to the plane parallel to the direction of relative displacement between the drum and the plane;

forming a fold in the piece of flexible sheet material substantially parallel to the fixed edge of the piece of flexible sheet material;

inserting one edge of the sheet of fibers into said fold; and displacing the fold towards the fixed edge of the piece of flexible sheet material.

The invention also provides apparatus for implementing the method. The apparatus comprises:

a cutting member for cutting the sheet of fibers along a line of cut that is substantially parallel to the axis of rotation of the drum;

means for laying the sheet of fibers on a plane in a rectilinear direction;

means for rolling up the sheet of fibers into a single bundle of fibers about an axis perpendicular to the line of cut; and means for cutting up the bundle of fibers that results from rolling up the sheet of fibers into a plurality of bundles for membrane devices.

According to a feature of the apparatus of the invention, the means for laying the sheet of fibers on a plane comprise a table that is movable relative to the drum in a direction perpendicular to the axis of rotation of the drum, said table having a table top defining the plane on which the sheet of fibers is laid. Advantageously, the apparatus further includes means for synchronizing the linear displacement of the table and the rotation of the drum while the sheet of fibers is being paid out onto the table.

According to another feature of the apparatus of the invention, the means for rolling up the sheet of fibers comprise:

a piece of flexible sheet material having a fixed edge held to the plane parallel to the direction in which the sheet of fibers is laid on the plane; and means for forming a fold in said piece of flexible sheet material substantially parallel to said fixed edge, and for displacing the fold in a direction perpendicular to the direction in which the sheet of fibers is laid on the plane. These means advantageously further include means for adjusting the diameter of the bundle of fibers formed in the fold.

BRIEF DESCRIPTION OF THE DRAWINGS

Other characteristics and advantages of the invention appear on reading the following description. Reference is made to the accompanying drawings, in which.

DETAILED DESCRIPTION

Figure 1:
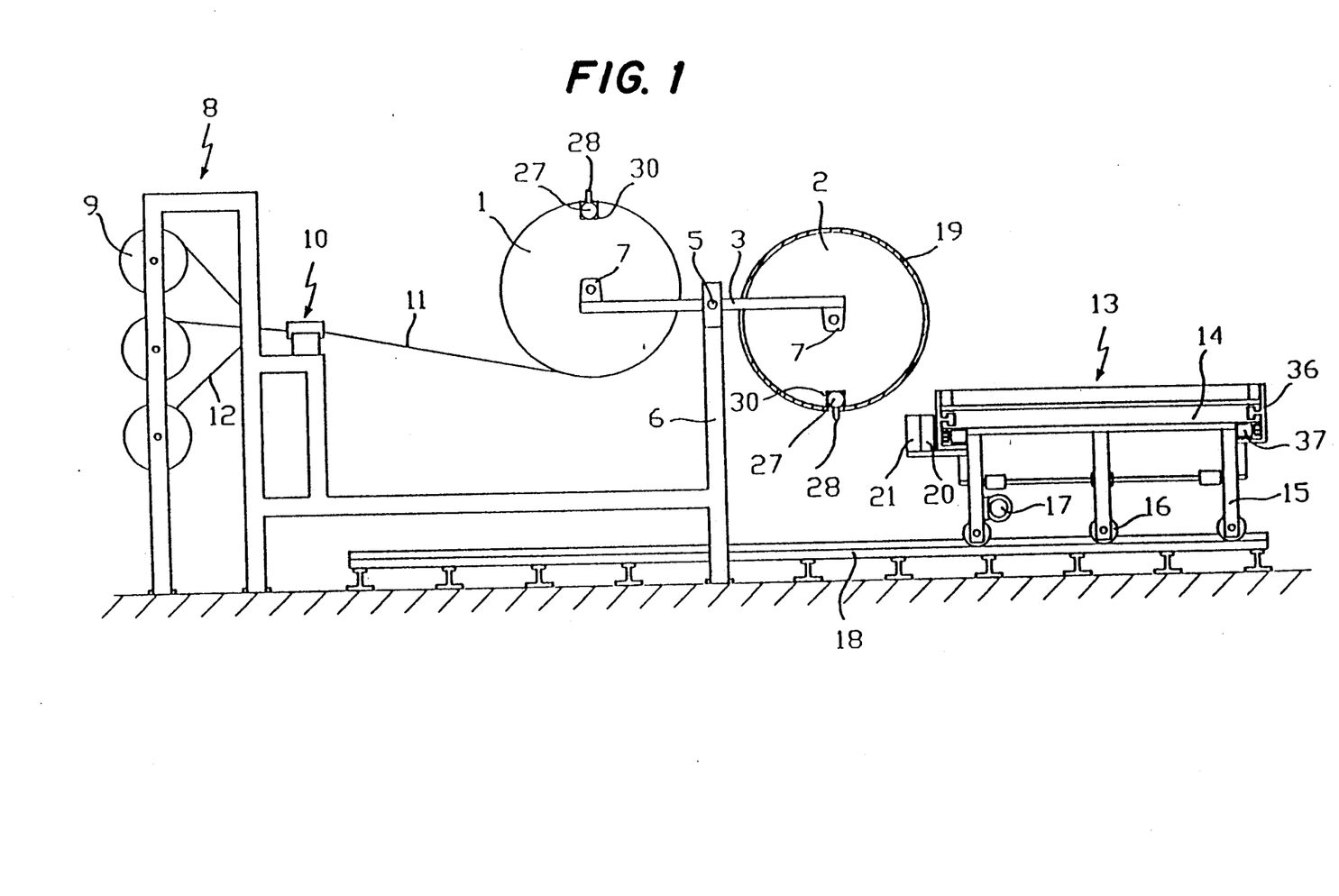
FIG. 1 is a diagrammatic elevation view of apparatus of the invention for manufacturing bundles of hollow fibers.

The apparatus for manufacturing bundles of hollow fibers shown in FIG. 1 includes two identical cylindrical drums 1 and 2 which are coupled together in parallel with each other by two parallel bars 3 and 4 that are perpendicular to the respective axes of the drums. The assembly is mounted on a fixed support 6 to pivot about an axis 5 which is parallel to the axes of the drums 1 and 2. The drums 1 and 2 are held on the bars 3 and 4 via bearings 7 enabling them to rotate about their respective axes. The bearings 7 are fixed to the bars 3 and 4 in such a manner that the pair of bearing supporting the drum 1 and the pair of bearings supporting the drum 2 are disposed on opposite sides of a plane that includes the longitudinal axes of the bars 3 and 4. As a result, when the bars 3 and 4 are locked in a horizontal plane, the drum 1 is offset upwards relative to the drum 2 (the position shown in FIG. 1; with the reference numerals "1" and "2" being used below to identify the drums in this particular position, the drums otherwise being identical, as mentioned above). A motor (not shown) serves to rotate the drum 1, with the drum 2 then being free to rotate about its own axis. Another motor (not shown) enables the positions of the drums 1 and 2 to be swapped over by rotating the assembly comprising the drums 1 and 2 and the coupling bars 3 and 4 about the axis 5 in an anticlockwise direction.

A paying-out device 8 designed to receive a plurality of reels 9 of fiber is disposed facing the drum 1. A conventional fiber-guiding member 10 is interposed between the paying-out means 8 and the drum 1. The fiber-guiding member comprises a guide mounted on a moving carriage that moves back and forth parallel to the axis of the drum 1. The guide passes one or more stranded-together sets 11 of fibers made up upstream from the fiber-guiding member of individual fibers 12 (or stranded together set of fibers) taken from the reels 9. The free end of the set 11 is fixed to the drum 1 so as to be spiral wound thereon when the drum 1 is rotated and the carriage of the fiber-guiding member is caused to move.

The apparatus of the invention also includes a motor-driven moving table 13 fitted with various accessories for receiving a sheet of fibers 19 after it has been formed on the drum 1 and for transforming it into a bundle of fibers.

The moving table 13 comprises a table top 14 mounted on legs 15 provided with grooved wheels 16, with a pair of them being driven by a motor 17. The wheels are designed to run on two parallel rails 18 of complementary section (triangular in the drawings) which extend perpendicular to the axes of the drums 1 and 2 and in part beneath them. The length and disposition of the rails relative to the drums 1 and 2 are selected to enable the table 13 to move at least between two limit positions in which each of the ends of the table are disposed vertically beneath the axis of the drum 2. The length and the width of the table top 14 are respectively not less than the circumference and not less than the width of the drums 1 and 2, and the circumference is advantageously selected to be equal to a common multiple of the respective (different) lengths of the bundles of fibers for membrane devices that have different membrane areas. The height of the table top 14 is chosen so that when the drum 2 is vertically above the table, and the bars 3 and 4 are therefore horizontal, then the sheet 19 formed on the drum 2 is substantially tangential to the top surface of the table top 14. In this position, any displacement of the table causes the drum 2 to rotate, the drums being provided at one of their ends with teeth 40 (see FIG. 2) for co-operating with a rack 41 (see FIG. 3) disposed along the corresponding longitudinal edge of the table top 14, with the teeth 40 and the rack 41 constituting means for mechanically synchronizing the rotation of the drum 2 and the translation of the table 13.

At the front of the table 13 ("front" being defined as the end of the table 13 that faces the drums 1 and 2), the legs 15 carry the following projecting ahead of the edge of the table top 14: a cutting member 20 for cutting the sheet of fibers 19 present on the drum 2; and a member 21 for installing holding means on the drum 2 for holding the sheet of fibers 19 pressed against the drum close to a region where the line of cut is to pass. The cutting member 20 comprises a moving carriage 22 supporting a retractable blade 23 whose cutting edge faces upwards. The carriage 22 is moved along a direction parallel to the axis of the drum 2 by any appropriate means, e.g. a worm screw 24 driven by a motor 25. The vertical stroke of the blade 23 is designed so that when the cutting device 20 is substantially vertically beneath the axis of the drum 2 then the blade 23 does not interfere with the sheet 19 formed on the drum 2 while the blade is retracted, and so that it is tangential to the drum when it is extended.

Figure 2A:
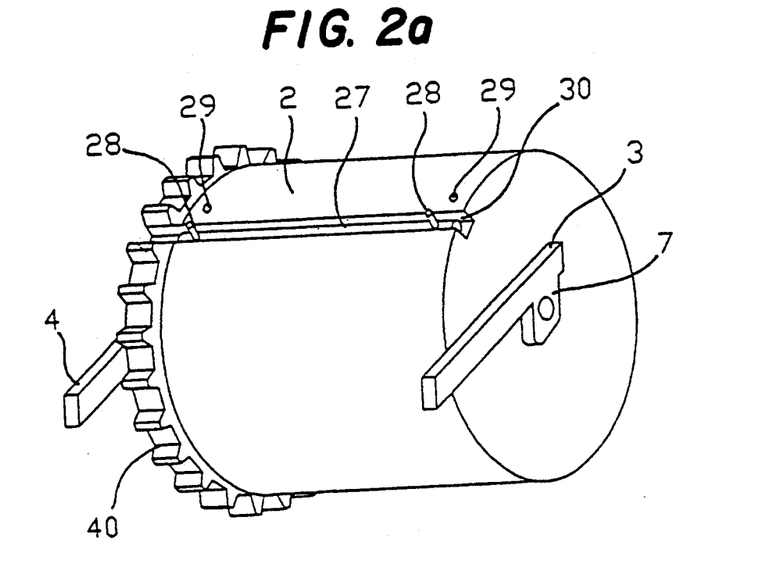
FIGS. 2a and 2b are perspective views of a drum for the apparatus of the invention and shown during two different manufacturing steps.
Figure 2B:
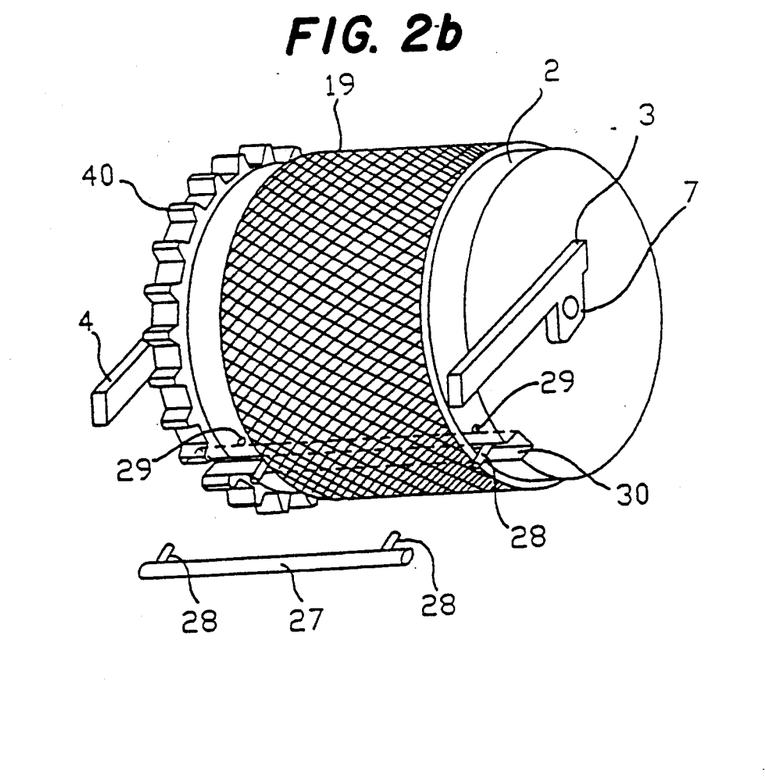
Figure 3:
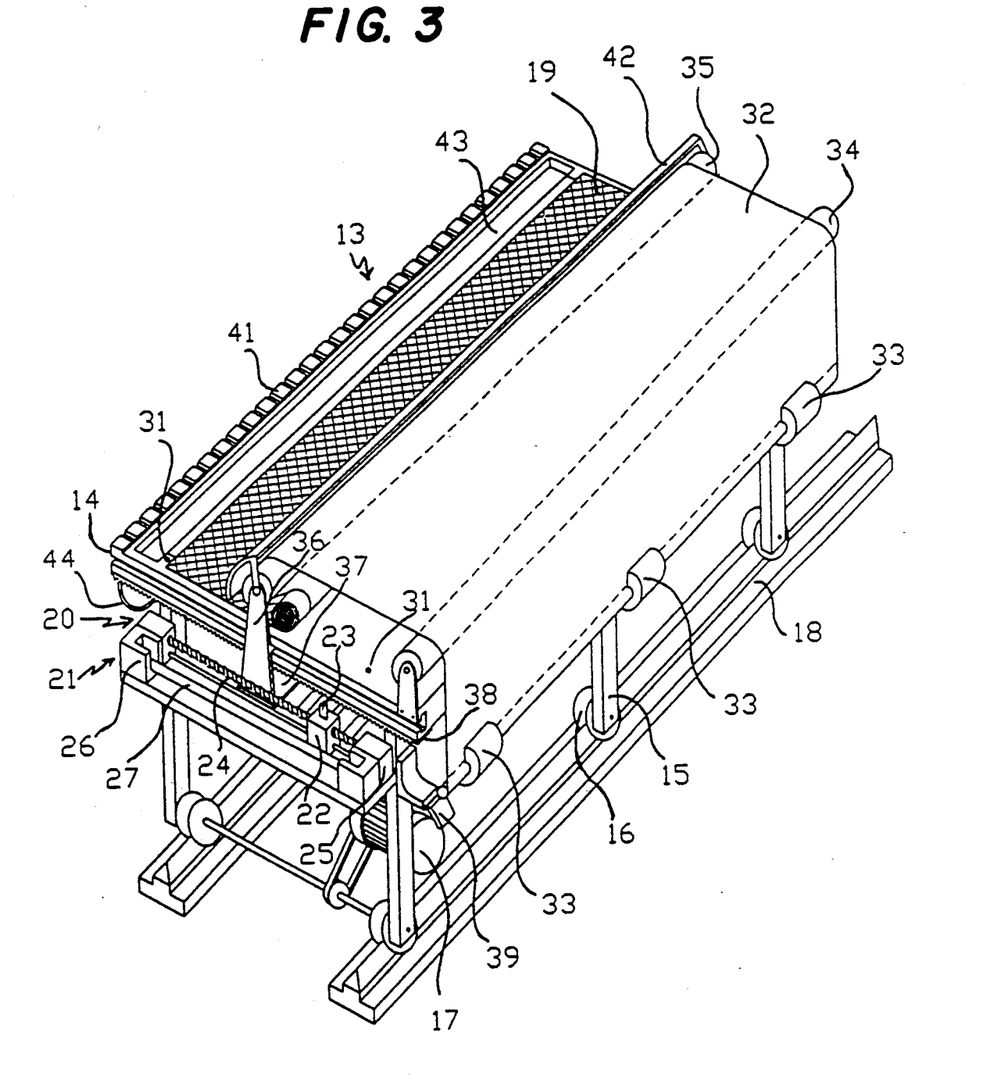
FIG. 3 is a perspective view of a portion of the apparatus of the invention.

The member 21 comprises two lift elements 26 designed to urge each of the ends of a bar 27 upwards, which bar constitutes the above-mentioned means for keeping the sheet of fibers 19 pressed against the drum 2 close to the region where the line of cut is to pass. As can be seen in FIG. 2, each of the ends of the bar 27 is provided with a stud 28 for penetrating into and being locked within corresponding orifices 29 in the drum by locking means that are magnetic, for example. When the bar 27 is locked against a drum on which a sheet of fibers 19 is formed, it exerts a slight pressure thereagainst which is sufficient to keep the sheet pressed against the drum after it has been cut by the cutting member 20 along a line of cut which is parallel to the axis of the drum and close to the region where the bar 27 presses thereagainst.

The apparatus includes second means for holding the sheet 19 for the purpose of being cut against a region close to the region defined by the bar 27, with the sheet 19 being cut between these two regions. This second means is constituted by another bar 27 which is installed in a groove 30 in the drum 1, 2 prior to the sheet of fibers 19 being formed on the drum, and remaining therein until the sheet 19 is payed out in a manner explained below. The groove 30 is parallel to the axis of the drum 1, 2 and close to the orifices 29. It contains resilient clamping means for the bar 27 to keep the bar in a position where the studs 28 project radially from the groove 30, so as to be able during a subsequent stage of the manufacturing method to penetrate into and be locked in two corresponding orifices 31 formed in the top 14 of the table 13 close to its front edge by locking means that are magnetic, for example.

The table 13 is also provided with means for rolling up a sheet 19 about an axis parallel to its longitudinal sides after it has been removed from the drum 2 and laid flat on the table top 14. These means comprise a piece 32 of flexible sheet material and means for forming a fold therein and for displacing the fold in such a manner as to insert a longitudinal edge of the sheet of fibers into the fold which is then rolled up as the fold advances.

The piece of flexible sheet material 32 is rectangular and is fixed along one edge close to a longitudinal edge of the table top 14 in a direction parallel to the direction in which the table 13 moves. It is large enough to cover the major portion of the table top, with the orifices 31 being left open, and to hang down from the opposite edge of the table top 14 after passing over a return roller 34 disposed along said edge. The free longitudinal edge of the piece 32 is weighted by a bar having removable masses 33 fixed thereon, with the weight thereof being selected as a function of the desired diameter for the bundle of fibers that results from rolling up the sheet of fibers.

The means for forming and moving a longitudinal fold in the piece of flexible sheet material 32 comprise a roller 35 displaceable parallel to the sides of the table top 14 and having the same length, the piece of material 32 passing over the roller 35. The roller 35 is held a little above the table top 14 by two supports 36 mounted to slide along respective ends of the table top 14. Each support 36 extends beneath the table top 14 to serve as a box for a motor 37 driving a toothed wheel that meshes with a rack 38 fixed beneath the table top 14 and extending along the corresponding end thereof. To form the fold beneath the roller 35 prior to rolling up the sheet 19, moving abutments 39 fixed to the legs 15 serve to hold up the bar weighting down the piece 32 so that it is no longer under tension, and so that it has an amount of slack corresponding to the fold. A fold-forming member comprising a flap 42 mounted to pivot about the axis of the roller 35 is provided to insert the slack given in the piece 32 beneath the roller 35, which slack when folded over onto itself constitutes the fold.

Along the edge of the piece 32 that is fixed to the table top 14, the table top includes a rectangular opening 43 to enable the bundle of fibers retained by the fold in the piece 32 to escape from the fold. A gutter 44 disposed beneath the opening 43 serves to collect the bundle formed in this way for subsequent treatment.

Figure 4:
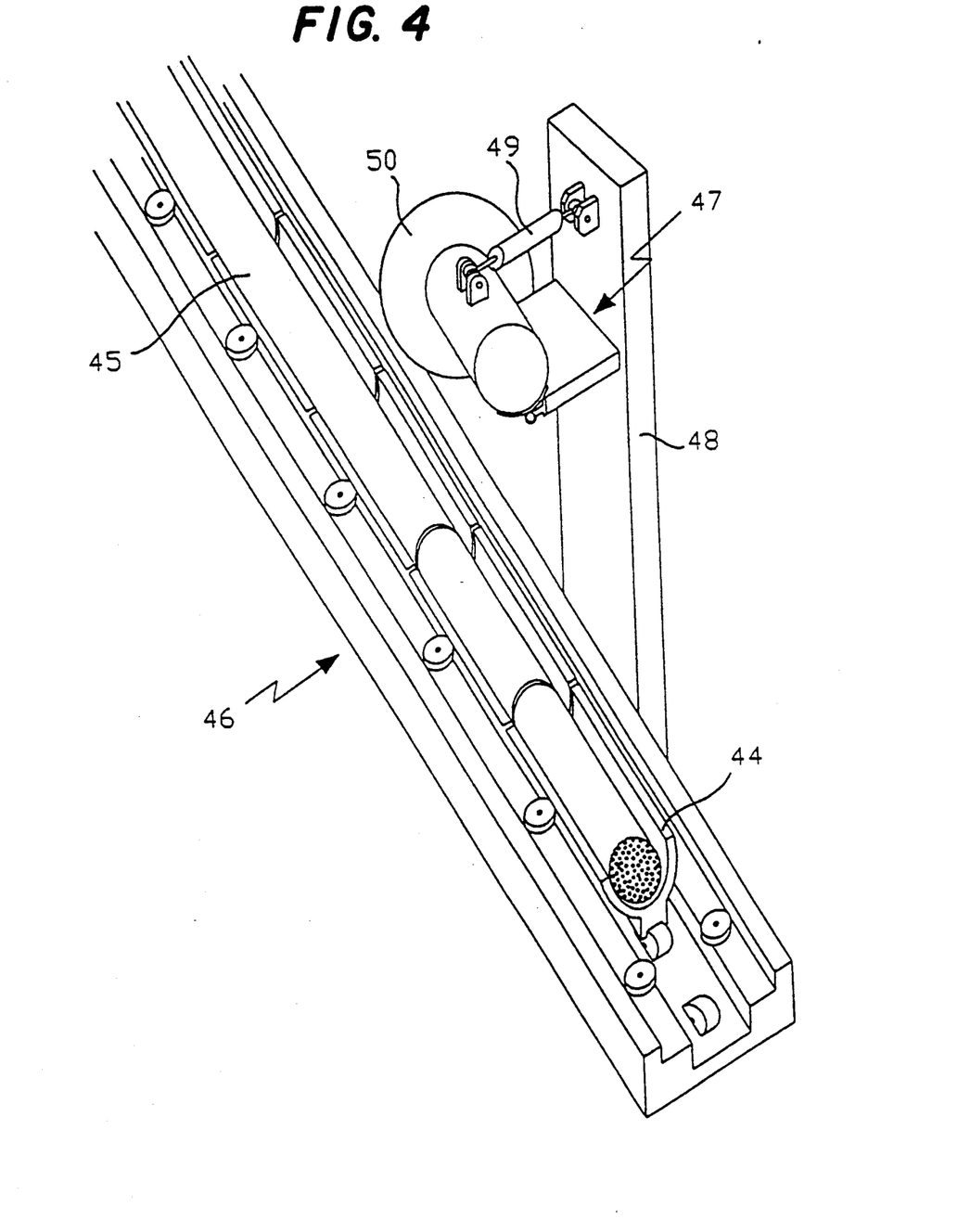
FIG. 4 is a fragmentary diagrammatic perspective view of another portion of the apparatus of the invention.

In FIG. 4, it can be seen that the gutter 44 for collecting the single bundle of fibers 45 formed on the table 13 constitutes the moving portion of a conveyor 46 which is provided with stepwise drive means for driving through steps of adjustable length to displace the bundle of fibers 45 relative to means for cutting up the bundle 45. These means comprise a circular saw 47 pivotally mounted on a lateral support 48 of the conveyor 46 so as to respond to a double-acting actuator 49 by being lowered towards the conveyor 46 to cut through the bundle of fibers 45 and so as to be returned to its initial position, with the blade 50 of the saw extending in a plane that is perpendicular to the displacement direction of the conveyor 46 and with the gutter having gaps for receiving the blade at regular intervals corresponding to the step size of the conveyor 46. Depending on the desired length for the bundles, gutters are used having gaps at the corresponding spacing and the step size of the conveyor 46 is adjusted accordingly.

The operation of the above-described apparatus is explained below beginning with the apparatus being started. Both drums are bare and they occupy the position shown in FIG. 1 (the coupling bars 3 and 4 are horizontal), and a stranded set of fibers 11 is pulled onto the drum 1 and fixed thereto. The drum 1 is then rotated anticlockwise and simultaneously the guide member is set into motion. The combined effect of rotating the drum 1 and of moving the guide member 10 back and forth gives rise to a sheet of fibers 19 being formed on the drum 1, said sheet being constituted by superposed layers of turns of the set of fibers, with the turns in any one layer forming a substantially constant angle relative to the turns in the immediately adjacent layers, said angle being determined by the speed of the carriage of the guide member for a given speed of rotation of the drum. When the sheet of fibers 19 on the drum 1 has the desired number of layers of turns, the drum 1 and the guide member are stopped. The positions of the drums are swapped over by pivoting the drum and coupling bar assembly about the axis 5. Towards the end of this pivoting motion, the stranded set of fibers 11 comes into contact with the bare drum 1 to which it is fixed automatically, and it is cut between the two drums. As soon as the drums have returned to the position shown in FIG. 1, the process of forming a sheet of fibers 19 on the drum 1 as described above can begin again.

Simultaneously, the process of treating the sheet 19 present on the drum 2 can also begin. On the table 13, the roller 35 has previously been displaced so as to be adjacent to the return roller 34, and the fold in the piece of flexible sheet material 32 has been formed beneath the roller 35 by the flap 42, with the weighting bar of the piece 35 resting on the abutments 39.

In a variant of the method of the invention, it is also at this stage that a flexible film for forming a sheath that is to contain the bundle of fibers that results from rolling up the sheet 19 is laid on the table top 14, i.e. also on the piece of sheet material 32, along the opening 43, with the width of the film being slightly greater than the diameter of the future bundle of fibers, and with its length being substantially equal to that of the bundle.

Figure 5A:
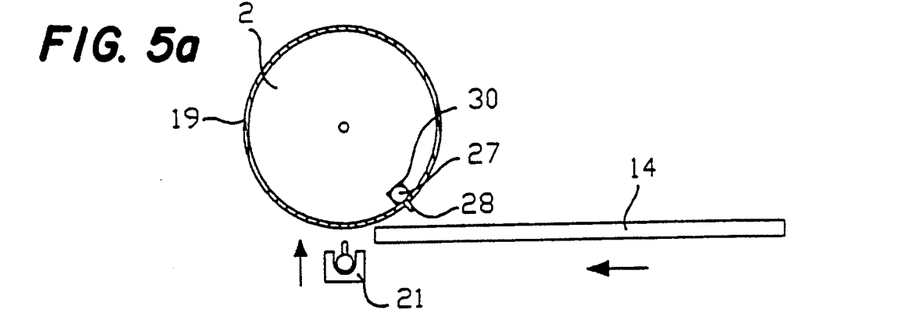
FIGS. 5a, 5b, 5c, and 5d are diagrams showing one stage in performing the method of the invention.
Figure 5B:
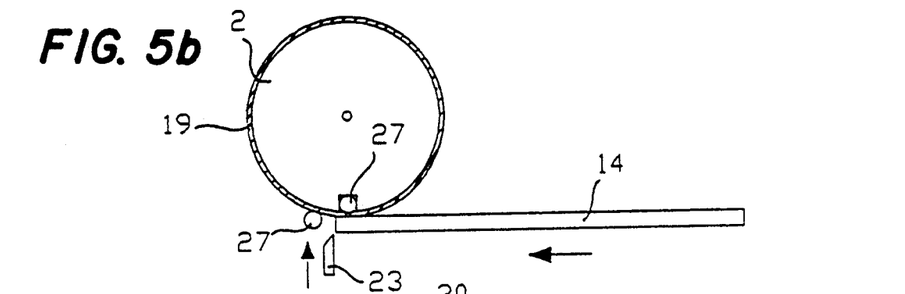
Figure 5C:
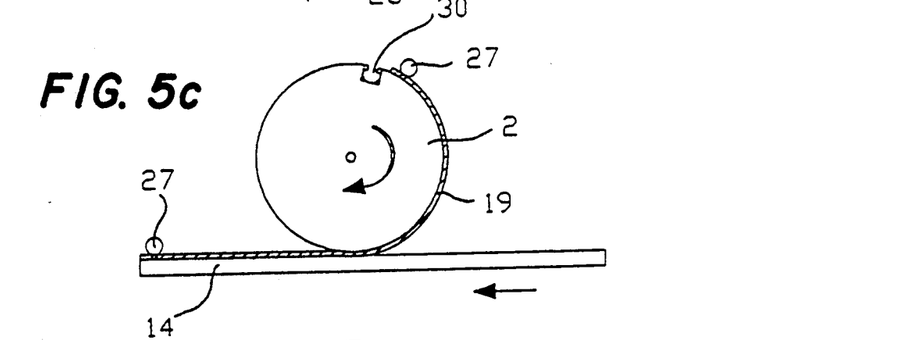
Figure 5D:
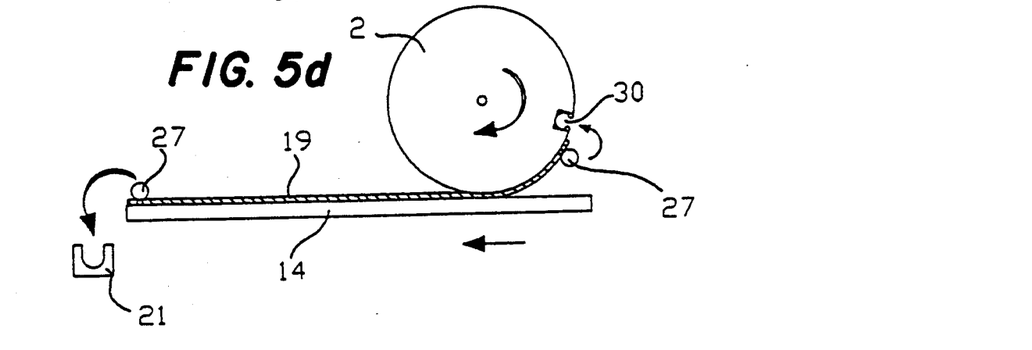

After these preliminaries have been performed, the table 13 advances towards the drum 2. When the means 21 for installing the bar 27 on the drum 2 lie vertically below the axis of the drum 2, the table 13 stops and the drum rotates until the studs 28 on the bar 27 are facing the orifices 29 in the drum 2. The bar 27 is then raised and the studs 28 penetrate into the orifices 29 where they are locked (FIG. 5a). The table 13 advances again while the drum 2 rotates slightly until the studs 28 on the bar 27 carried by the drum penetrate into the orifices 31 in the table top 14 where they are locked in turn. The sheet of fibers 19 is then held relative to the drum 2 along two linear regions that are parallel and close together, and between which the cutting member 20 moves the blade 23 to cut the sheet 19 along a rectilinear line of cut parallel to the axis of the drum 2 (FIG. 5b). Since the sheet of fibers 19 is held on either side of the line of cut it does not move off the drum 2, which is what would happen otherwise. At this stage, the teeth 40 carried by the drum 2 begin to mesh with the rack 41 carried by the table top 14. As a result, when the table 13 is set into motion, still in the same direction, it rotates the drum 2 and the sheet 19 is paid out onto the table top 14 (FIG. 5c). This motion causes the bar 27 that is locked to the table top 14 to move out from the groove 30 in the drum 2. When the rear edge of the table comes level with the drum 2, the bar 27 holding the sheet 19 pressed against the drum is unlocked and removed from the drum 2, and it is placed in the groove 30 of the drum. The bar 27 holding the sheet 19 pressed against the table top 14 at the other end of the table is also unlocked and removed from the table 13, and it is placed in the lift support 21. The sheet 19 is then fully paid out on the table top 14, and it merely lies thereon without being held in any other manner.

The table 13 is then reversed. When the table 13 has moved away from the region in which the drums 1 and 2 pivot about the axis 5, it stops. When the process of forming a sheet of fibers 19 on the drum 1 has been completed, the drums can be swapped over again as described above.

Independently, as soon as the table 13 has stopped, the sheet of fibers 19 is rolled up about an axis parallel to its sides. This result is achieved by displacing the fold formed beneath the roller 35 in the piece of sheet material 32 towards the opening 43 with the facing side of the sheet of fibers 19 engaging in the fold and being caused to fold onto itself to begin forming a spiral-wound bundle of fibers. Once the diameter of the bundle that has been started in the fold exceeds the gap between the roller 35 and the table top 14, the bar weighting the piece of flexible sheet material 32 is released by retracting the moving abutments 42, and a constant tension is exerted on the piece 32, thereby tending to reduce the size of the fold and to tighten the bundle. Since the distance between the roller 35 and the table top 14 is chosen to be close to the thickness of the sheet of fibers 19, the bundle that forms in the fold cannot escape therefrom in spite of the tension exerted by the weight of the masses 33, which weight is chosen to obtain a bundle of fibers having a determined diameter.

When the moving roller 35 comes level with the side of the table top 14 carrying the rack 41, the bundle of fibers formed in the fold of the piece of sheet material 32 is tipped into the opening 43 and falls into the gutter 44.

If a flexible film for forming a sheath to contain the bundle of fibers 45 has previously been placed on the table top 14 before the step of unrolling the sheet of fibers 19 onto the table top 14, then at the end of the step of rolling up the sheet of fibers 19, this film surrounds the bundle of fibers 45. While the bundle of fibers 45 is still on the table 13, the cylindrical casing formed by the film is closed up by welding or gluing together its longitudinally extending edges, with the width of the film being selected so that its edges overlap.

As soon as the single bundle of fibers 45, whether or not it is encased in a film, has fallen into the gutter 44, it is displaced stepwise by the conveyor 46 with a step size corresponding to the length desired for the individual bundles, and it is displaced past the circular saw 47 which cuts it up into a plurality of individual bundles.

Optionally, after a subsequent treatment stage (in particular, centrifuging if filled with a liquid that must be removed to enable the bundles to be fixed in housings of a membrane device), these bundles are inserted in respective housings and are then fixed therein by gluing.

In a variant of the invention, when the single bundle of fibers 45 obtained on the table 13 does not require special treatment prior to being fixed in the housings of a membrane device, the housings (which are tubular) are threaded one after another on the single bundle 45 which is then cut up at the joins between pairs of consecutive housings.

The present invention is not limited to the embodiment described above, and variants may be provided.

In particular, in the apparatus described, the sheet of fibers 19 present on the drum 2 is paid out onto the table top 14 by moving the table 13 in translation while the drum 2 remains fixed. Naturally it would also be possible for this to occur the opposite way round so long as the two drums are not coupled together.

In addition, it may be observed that with the apparatus described, it is not essential to provide two special means (bars 27) for holding the sheet of fibers 19 along two linear regions in order to prevent the sheet coming off the drum after it has been cut: it would suffice merely to adjust the distance between the drum 2 and the table top 14 in such a manner that during the stage shown in FIG. 4b, the sheet 19 is lightly clamped between the drum and the table top.

The mechanical synchronization between the motion of the drum 2 and the motion of the table 13 may be replaced by electrical synchronization providing the drum 2 has its own motor, in which case synchronization is implemented by appropriately controlled the motors driving the table 13 and the drum 2.

Depending on the range of lengths of individual bundles that need to be manufactured, it may be difficult for practical reasons to provide drums having a diameter equal to a common multiple of said lengths, so an advantageous variant of the invention consists in providing the apparatus with drums 1 and 2 that are of adjustable diameter, which drums may be constituted by respective pluralities of radially expansible drum components.

I claim:

1. A method for manufacturing a plurality of bundles of semipermeable fibers for a membrane device, the method comprising the steps of:
   winding a fiber or a strand of fibers on a drum to form a sleeve of fibers comprising at least two superposed spirals of fibers defining an angle between them;
   cutting the sleeve of fibers on the drum along a line of cut substantially parallel to a rotation axis of the drum to form a sheet of fibers;
   transferring the sheet of fibers from the drum onto a plane;
   rolling up the sheet of fibers on the plane in a direction perpendicular to the line of cut to form a single bundle of fibers; and
   cutting up the single bundle of fibers into a plurality of bundles of fibers.

2. A method according to claim 1, wherein the single bundle of fibers is placed in a sheath prior to the step of cutting up the single bundle of fibers into a plurality of bundles of fibers.

3. A method according to claim 2, wherein a flexible film for forming the sheath is laid on the plane prior to the step of transferring the sheet of fibers onto the plane, so that upon completion of the step of rolling up the sheet of fibers, the film envelops the single bundle of fibers, and the film closes onto itself by fixing together its longitudinal edges.

4. A method according to claim 1, wherein prior to the step of cutting the sleeve of fibers, the sleeve of fibers is held stationary relative to the drum on either side of a region along which the line of cut is to pass.

5. A method according to claim 4, wherein the sleeve of fibers is held stationary relative to the drum along two substantially linear first and second regions, the first region being defined by pressing the sleeve of fibers against the drum along a generator line of the drum, and the second region being defined by pressing the sleeve of fibers against the plane along a line of tangency between the drum and the plane.

6. A method according to claim 1, wherein the step of transferring the sheet of fibers onto the plane comprises causing the drum to rotate, and simultaneously causing relative displacement of the drum and the plane in a direction perpendicular to the rotation axis of the drum, the rotation axis of the drum being parallel to the plane.

7. A method according to claim 6, wherein the plane is displaced substantially tangentially to the drum.

8. A method according to claim 1, wherein the step of rolling up the sheet of fibers comprises:
laying the sheet of fibers on a piece of flexible sheet material having a fixed edge held to the plane parallel to a direction of relative displacement between the drum and the plane;
forming a fold in the piece of flexible sheet material substantially parallel to the fixed edge of the piece of flexible sheet material;
inserting one edge of the sheet of fibers into said fold; and
displacing the fold towards the fixed edge of the piece of flexible sheet material.

9. A method according to claim 8, wherein a diameter of the single bundle of fibers is adjusted by tension exerted substantially perpendicularly to the fold in the piece of flexible sheet material.

10. A method according to any one of claims 1 to 9, wherein prior to the step of cutting up the single bundle of fibers into a plurality of bundles of fibers, a corresponding number of tubular housings is threaded one after another on the single bundle of fibers.

11. A method simultaneously using first and second rotatable drums for manufacturing a plurality of bundles of semipermeable fibers for a membrane device, the method comprising the steps of:
winding a fiber or a strand of fibers on the first drum at a first location to form a first sleeve of fibers having at least two superposed spirals of fibers defining an angle between them;
cutting a second sleeve of fibers previously formed on the second drum at a second location to form a sheet of fibers, the cutting being along a line of cut substantially parallel to a rotation axis of the second drum;
transferring the sheet of fibers from the second drum onto a plane; and
moving the first drum into the second location and the second drum into the first location when the winding step on the first drum and the transferring step from the second drum are ended, such that the steps of winding, cutting, and transferring are repeatable.

12. A method according to claim 11, wherein after the step of transferring the sheet of fibers onto the plane, the method further comprises the steps of:
rolling up the sheet of fibers on the plane in a direction perpendicular to the line of cut to form a single bundle of fibers; and
cutting up the single bundle of fibers into a plurality of bundles of fibers.

* * * * *